(12) United States Patent
Que et al.

(10) Patent No.: US 10,396,430 B2
(45) Date of Patent: Aug. 27, 2019

(54) TOUCH SCREEN INTEGRATED WITH NFC ANTENNA, TERMINAL, AND NEAR FIELD COMMUNICATION METHOD THEREFOR

(71) Applicant: SHENZHEN GOODIX TECHNOLOGY CO., LTD., Shenzhen, Guangdong (CN)

(72) Inventors: Bincheng Que, Guangdong (CN); Jinchun Ye, Guangdong (CN); Gengchun Deng, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 22 days.

(21) Appl. No.: 15/248,695

(22) Filed: Aug. 26, 2016

(65) Prior Publication Data
US 2016/0365620 A1   Dec. 15, 2016

Related U.S. Application Data

(63) Continuation of application No. PCT/CN2015/072822, filed on Feb. 12, 2015.

(30) Foreign Application Priority Data

Dec. 9, 2014   (CN) .......................... 2014 1 0746166

(51) Int. Cl.
*G06F 3/041* (2006.01)
*G06F 3/047* (2006.01)
(Continued)

(52) U.S. Cl.
CPC ........... *H01Q 1/2266* (2013.01); *G06F 3/047* (2013.01); *G06F 3/0412* (2013.01);
(Continued)

(58) Field of Classification Search
None
See application file for complete search history.

(56) References Cited

U.S. PATENT DOCUMENTS 8,718,553 B2   5/2014   Parekh et al.
8,725,088 B2   5/2014   Ginsburg et al.
(Continued)

FOREIGN PATENT DOCUMENTS

CN   103259569 A   8/2013
CN   103904411 A   7/2014
(Continued)

OTHER PUBLICATIONS

State Intellectual Property Office of the P.R. China, "First Office Action for CN Application No. 201410746166.8", China, dated Apr. 14, 2016.
(Continued)

*Primary Examiner* — Chad M Dicke
(74) *Attorney, Agent, or Firm* — Heslin Rothenberg Farley & Mesiti P.C.

(57) ABSTRACT

The present disclosure is applicable to the technical field of near field communication, and in particular, provides an NFC antenna-integrated touch screen, a terminal and a near field communication method thereof. The touch screen comprises a substrate, the substrate having a touch sensing region, a touch sensing electrode pattern being arranged in the touch sensing region; wherein a single-turn conductive wire is arranged on an outer side of the touch sensing region, the conductive wire being connected to an external near field communication manager as a screen antenna for near field communication.

5 Claims, 6 Drawing Sheets

(51) Int. Cl.
*H01Q 1/22* (2006.01)
*H01Q 1/48* (2006.01)
*H01Q 1/24* (2006.01)
*H01Q 1/44* (2006.01)
*H04B 5/00* (2006.01)
*H01Q 7/00* (2006.01)

(52) U.S. Cl.
CPC ......... *G06F 3/0416* (2013.01); *H01Q 1/243* (2013.01); *H01Q 1/44* (2013.01); *H01Q 1/48* (2013.01); *H01Q 7/00* (2013.01); *H04B 5/0031* (2013.01); *H04B 5/0081* (2013.01)

(56) References Cited

U.S. PATENT DOCUMENTS

| | | | | |
|---|---|---|---|---|
| 9,071,955 B2* | 6/2015 | Yamaoka | | H04W 8/22 |
| 9,846,517 B2* | 12/2017 | Li | | G06F 3/044 |
| 2008/0252421 A1* | 10/2008 | Khannur | | G06K 7/0008 |
| | | | | 340/10.1 |
| 2010/0265189 A1* | 10/2010 | Rofougaran | | G06F 3/046 |
| | | | | 345/173 |
| 2011/0012794 A1* | 1/2011 | Schlub | | H01Q 1/243 |
| | | | | 343/702 |
| 2011/0121944 A1* | 5/2011 | Kang | | G06K 19/07749 |
| | | | | 340/10.1 |
| 2011/0147465 A1* | 6/2011 | Kang | | G06K 19/0723 |
| | | | | 235/492 |
| 2011/0241967 A1* | 10/2011 | Kaikkonen | | H01L 27/0248 |
| | | | | 343/851 |
| 2011/0293039 A1* | 12/2011 | Tsushima | | H04L 27/06 |
| | | | | 375/296 |
| 2012/0133597 A1* | 5/2012 | Chen | | G06F 3/044 |
| | | | | 345/173 |
| 2012/0309310 A1* | 12/2012 | Greuet | | H04B 5/0031 |
| | | | | 455/41.1 |
| 2012/0329524 A1* | 12/2012 | Kent | | G06F 3/044 |
| | | | | 455/566 |
| 2013/0009895 A1* | 1/2013 | Paulsen | | G09G 5/00 |
| | | | | 345/173 |
| 2013/0015938 A1 | 1/2013 | Park | | |
| 2013/0016447 A1* | 1/2013 | Kitabata | | H03F 1/52 |
| | | | | 361/56 |
| 2013/0196596 A1* | 8/2013 | Parekh | | G06F 1/1643 |
| | | | | 455/41.1 |
| 2013/0207925 A1* | 8/2013 | Ryshtun | | G06F 3/0416 |
| | | | | 345/174 |
| 2013/0341409 A1 | 12/2013 | Wu et al. | | |
| 2014/0011536 A1* | 1/2014 | Zhu | | H04B 1/10 |
| | | | | 455/552.1 |
| 2014/0176371 A1 | 6/2014 | Liao | | |
| 2014/0187153 A1 | 7/2014 | Zhu et al. | | |
| 2015/0381238 A1* | 12/2015 | Wolf | | H04W 4/80 |
| | | | | 455/41.1 |
| 2016/0026302 A1* | 1/2016 | Li | | G06F 3/044 |
| | | | | 345/174 |
| 2016/0320910 A1* | 11/2016 | Fang | | G06F 3/0416 |
| 2017/0013660 A1* | 1/2017 | Cheng | | H04W 76/14 |
| 2017/0077996 A1* | 3/2017 | Kim | | H02J 50/12 |

FOREIGN PATENT DOCUMENTS

| | | |
|---|---|---|
| CN | 103904412 A | 7/2014 |
| CN | 104090680 A | 10/2014 |
| CN | 104124997 A | 10/2014 |
| CN | 102819346 A | 12/2014 |
| EP | 2087609 B1 | 4/2013 |
| EP | 2620845 A9 | 5/2014 |
| KR | 20120063652 A | 6/2012 |
| WO | 02/071536 A1 | 9/2002 |

OTHER PUBLICATIONS

State Intellectual Property Office of the P.R. China, "First Office Action for CN Application No. 201410746166.8", China, Nov. 9, 2016.

State Intellectual Property Office of the P.R. China (ISR/CN), "International Search Report for PCT/CN2015/072822", China, dated Sep. 9, 2015.

Communication pursuant to Article 94(3) EPC for European Application No. 15866742.8 dated May 16, 2019.

* cited by examiner

TOUCH SCREEN INTEGRATED WITH NFC ANTENNA, TERMINAL, AND NEAR FIELD COMMUNICATION METHOD THEREFOR

CROSS-REFERENCE TO RELATED APPLICATIONS

This application is a continuation of International Patent Application No. PCT/CN2015/072822, with an international filing date of Feb. 12, 2015, designating the U.S., now pending, which is based on Chinese Patent Application No. 201410746166.8, filed Dec. 9, 2014. The contents of these specifications are incorporated herein by reference.

BACKGROUND OF THE INVENTION

Field of the Invention

The present disclosure relates to the technical field of near field communication, and in particular, relates to an NFC antenna-integrated touch screen, a terminal and a near field communication method thereof.

Description of the Related Art

Near field communication (NFC) is a technology which implements non-contact identification and interconnection, which employs 13.56 MHz near field magnetic field communication mode and implements short-range wireless communication between mobile terminals or devices, consumer electronic products, PCs and smart control tools. This allows users to exchange information, and access contents and services simply and visually. Therefore, the NFC technology is an indispensable technology in the future electric products, and has a huge market potential.

Currently, touch screens of most mobile phones are integrated with the NFC function. However, the antenna of the conventional NFC product is mainly disposed on a face of the battery or attached inside the shell. Generally, coils are formed by means of metal wiring on a PCB, and then the PCB or FPC having the coils is attached on the shell or the battery. The disadvantages lie in that the battery and the shell generally need to be repeatedly disassembled or assembled, such that the junction part of the NFC antenna tends to be damaged or tends to be misaligned, which finally causing poor antenna signals and affecting use of the NFC function. In addition, the antenna of a NFC product is generally disposed inside the shell of the electronic product. If the shell is made from a metal material, the propagation of an NFC signal may be affected. Therefore, some limitations are caused to selection of materials of the shell of the electronic product.

Accordingly, such deployment of the NFC antenna is not reasonable, and the junction thereof tends to be damaged or tends to be not aligned. As a result, antenna signals become poor, and selection of materials of the shell of the electronic product is subjected to limitations. To solve the technical problem, the Chinese patent application titled with NFC ANTENNA-INTEGRATED TOUCH SCREEN, with the publication number CN 102819346 A has disclosed a touch screen integrated with an NFC antenna, wherein the NFC antenna is disposed on the touch screen and connected to a control board with a control chip, which integrating the touch control function and the NFC antenna function. Since the touch screen is a component that does not need to be disassembled and assembled, during the use of an NFC antenna, poor signals, junction failures and the like problem caused by the interface abrasion and non-alignment in the related art may be prevented, and in addition it is favorable to receiving and sending signals by the antenna, ensuring smooth communication. In addition, a solution is provided for practice the scenario where the NFC signals are more conveniently received from the touch surface of the touch screen, or the NFC signal must be received from the touch surface of the touch screen. In addition, the electronic product equipped with the above touch screen transfers signals through the touch surface, thus the electronic product is not subjected to limitations caused by the NFC antenna when selecting materials of the shell.

Although the above patent application may prevent some of the problems of the electronic product integrated with the NFC function, other problems may also be caused. For example, the NFC antenna has multiple turns of coils fabricated by using the conductive wires in a wiring manner, which inevitably unfavorable to the process of the narrow frame screen.

SUMMARY OF THE INVENTION

An NFC antenna-integrated touch screen, including a substrate, the substrate having a touch sensing region, a touch sensing electrode pattern being arranged in the touch sensing region; wherein a single-turn conductive wire is arranged on an outer side of the touch sensing region, the screen antenna being connected to an external near field communication manager as an antenna for near field communication.

A touch screen terminal according to the present disclosure includes an NFC antenna-integrated touch screen as defined above, and further includes a touch control chip and a terminal main controller; wherein the touch control chip includes a touch control manager and a near field communication manager; wherein the touch control manager is connected to the touch sensing electrode pattern, and configured to process a sensing signal from the touch control sensing electrode pattern and calculate a touch coordinate; and the near field communication manager is connected to an screen antenna, and configured to process a near field communication transaction; and the terminal main controller is configured to acquire and manage information of the touch control and near field communication.

A near field communication method of the touch screen terminal according to the present disclosure includes the following steps:

touch control detection: detecting, by a touch control manager, whether a touch control operation is performed on a touch screen, and send a calculated touch coordinate to a terminal main controller; and near field communication detection: after the touch control manager performs the touch control detection, performing by a near field communication manager, the near field communication detection.

According to the present disclosure, the ESD conductive wire of the touch screen is reused as the antenna for near field communication, and compatibility of the touch detection with the near field communication function is achieved with almost zero cost. Since there is only one turn of screen antenna, the screen antenna may be simply practiced and suitable for the design of narrow frame screen. Since the screen antenna is deployed on the substrate of the touch screen, and does not need to be disassembled, problems such as abrasion may be prevented and thus smooth near field communication may be ensured.

DETAILED DESCRIPTION OF THE EMBODIMENTS

To make the objective, technical solution, and advantages of the present disclosure clearer, the following section describes the technical solutions of the present disclosure in combination with the accompanying drawings and embodiments. It should be understood that the embodiments described here are only exemplary ones for illustrating the present disclosure, and are not intended to limit the present disclosure.

According to the present disclosure, an outermost layer of electrostatic discharge (ESD) conductive wire of a touch screen is modified to reuse this turn of ESD conductive wire as a near field communication antenna; in addition, a near field communication processing circuit, also referred to as a near field communication manager, is deployed in a touch control chip to implement fusion of the touch control technology and the near field communication technology.

Figure 1:
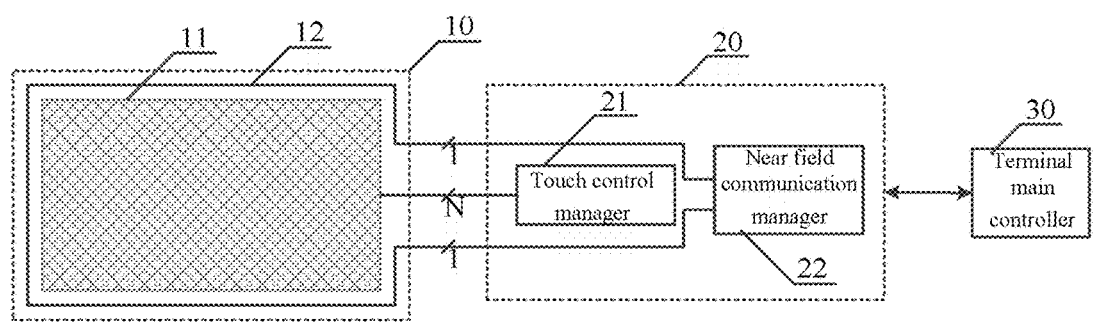
FIG. 1 is a structural principle diagram of a touch screen terminal having an NFC function according to an embodiment of the present disclosure.

FIG. 1 illustrates structural principles of a touch screen terminal having an NFC function according to an embodiment of the present disclosure. For ease of description, portions related to the present disclosure are only illustrated. The touch screen terminal includes a touch screen 10, a touch control chip 20 and a terminal main controller 30.

The touch screen 10 is an input device of a terminal device, and may be practiced by using a capacitive finger touch sensor screen and the like. In addition to sensing a touch operation performed by a finger, the touch screen achieves the functions of receiving signals and transmitting signals in the near field communication, and mainly includes a touch sensing region 11 and a screen antenna 12. The touch sensing region 11 includes a touch sensing electrode pattern, which can be practiced by using an indium tin oxide (ITO) electrode pattern, formed by several transparent conductive driving sensing lines of a strip shape or other shapes and is configured to sense a touch operation by the finger. The screen antenna 12 is a single-turn conductive wire, for example, a silver slurry or other conductive materials deployed on a periphery of the touch screen. It is previously used as a ground loop for ESD protection, and the ground loop is now used to implement both reception and transmission of near field communication signals and the ESD protections. In additions, the single-turn conductive wire is favorable to the design of a narrow frame.

Figure 2A:
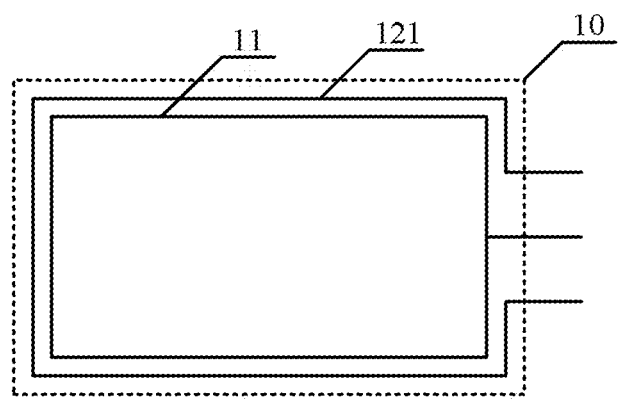
FIG. 2A is a schematic design diagram of an NFC antenna-integrated touch screen according to a first embodiment of the present disclosure.

FIG. 2A illustrates a design structure of the touch screen 10 according to a first embodiment of the present disclosure. In this embodiment, the screen antenna 12 is a contiguous annular line 121 arranged on a periphery of the touch sensing region 11, and has a line width of 0.1 to 2.0 mm and a thickness of 18 to 100 μm. The contiguous annular line 121 may form a direct current loop, and the impedance at the two tail ends thereof is less than 200 ohms. The electrode pattern of the touch sensing region 11 can be practiced by the conventional design.

Figure 2B:
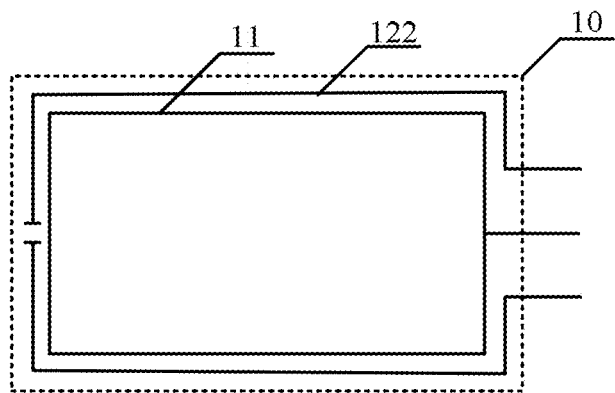
FIG. 2B is a schematic design diagram of an NFC antenna-integrated touch screen according to a second embodiment of the present disclosure.
Figure 3A:
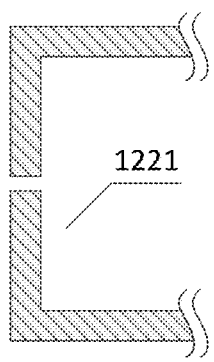
FIG. 3A and FIG. 3B are two schematic diagrams of a gap shape of an annular line in FIG. 2B.
Figure 3B:
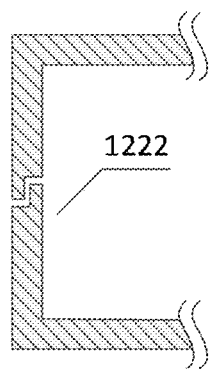

FIG. 2B is a design structure of the touch screen 10 according to a second embodiment of the present disclosure. In this embodiment, the screen antenna 12 is an intermediately disconnected annular line 122 arranged on a periphery of the touch sensing region 11. A gap at the disconnection of the annular line 122 is of a straight line shape as illustrated in FIG. 3A. The straight line shape can be simply practiced in engineering design, and the requirement on the process precision is lower than the requirement on the disconnection of a bent line. The intermediate disconnection has a spacing of 0.5 to 2 mm. This structure may be disadvantageous in that a slit is present in the middle part, and ESD protection fails to be provided for this part. In addition, the annular line 122 may also be a bent line shape as illustrated in FIG. 3B. The difficulty of such disconnected bent line is greater than the difficulty of the disconnected straight line in terms of practice and engineering design, and the requirement on the process precision is higher. The bent line has a spacing of 0.2 to 1 mm, and is advantageous in that there is no blind zone in ESD protection. Although the annular line 122 is intermediately disconnected and there is no direct current loop, the formed alternating current impedance is the same as that in the first embodiment, which is less than 200 ohms, with the same line width of 0.1 to 2.0 mm and a thickness of 18 to 100 μm.

Further referring to FIG. 1, the touch control chip 20 includes a touch control manager 21 and a near field communication manager 22; wherein the touch control manager 21 is connected to the touch sensing electrode pattern, and configured to process a sensing signal from the touch control sensing electrode pattern and calculate a touch coordinate; and the near field communication manager 22 is connected to two line terminals of the screen antenna, and configured to process a near field communication transaction. The terminal main controller 30 is configured to process most of the transactions of the touch screen terminal, and is also configured to acquire and manage information of touch control and near field communication.

Figure 4A:
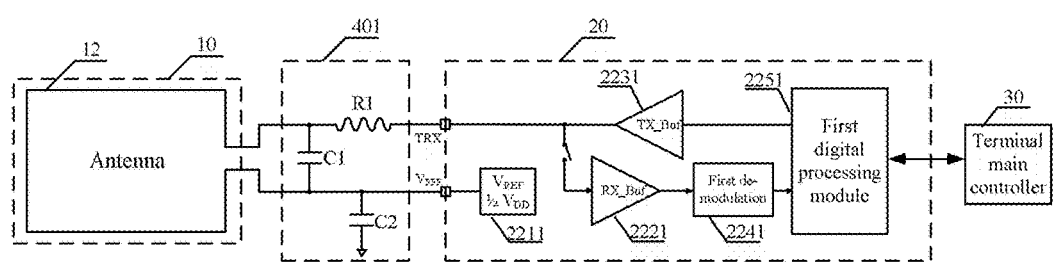
FIG. 4A is a schematic diagram of a structure of the near field communication manager and connection of the near field communication manager and a peripheral component according to the first embodiment of the present disclosure.

FIG. 4A illustrates a structure of the near field communication manager 22 and connection of the near field communication manager 22 and a peripheral component according to the first embodiment of the present disclosure. In this embodiment, the near field communication manager 22 includes a reference voltage module 2211, a first reception buffering module 2221, a first sending module 2231, a first demodulation module 2241 and a first digital processing module 2251. A reference voltage output terminal of the reference voltage module 2211 is electrically connected to the screen antenna 12, and provides a reference voltage and a bias for an interior and an exterior of the touch control chip 20. The voltage of the reference voltage module may be half of the voltage of the power source or may be another voltage, for example, ⅓ to ⅔ of the voltage of the power source. An input terminal of the first reception buffering module 222

1 is electrically connected to the screen antenna 12, and is mainly configured to buffer and amplify an external input signal. The signal is input via a single terminal. The input terminal of the first reception buffering module 2221 may also be electrically connected to the screen antenna 12 via a switch unit. When the sending module 2231 works, the switch unit before the first reception buffering module 2221 is switched off, to prevent the first sending module 2231 from interfering a working bias state of the first reception buffering module 2221. When the first sending module 2231 is idle, the switch unit before the first reception buffering module 2221 is switched on, to facilitate reception and processing of the screen antenna signal. An output terminal of the first sending module 2231 is electrically connected to the screen antenna 12, and is configured to send out, via the screen antenna 12, a near field communication signal to be transmitted, which is a single-terminal output buffer having a specific driving capability and capable of outputting a modulated 13.56 MHz square wave. When the first sending module is idle, the first sending module may enter a high impedance state, to prevent the input signal from being bypassed, and ensure that the first reception buffering module 2221 is capable of working in a normal bias state. An input terminal of the first demodulation module 2241 is connected to the first reception buffering module 2221, and is configured to demodulate the signal coupled by the screen antenna (that is, the screen antenna 12) and then processed by the first reception buffering module 2221, thereby completing the task of demodulation from a radio frequency field to a digital signal. A first digital processing module 2251 with one terminal being connected to an output terminal of the first demodulation module 2241 and an input terminal of the first sending module 2231 and with the other terminal being connected to the terminal main controller 30 is configured to decode the digital signal obtained via demodulation by the first demodulation module 2241, and send a decoding result to the terminal main controller 30; and is further configured to receive data to be sent from the terminal main controller 30 and demodulate the received data, and output a signal upon modulation to the first sending module 2231.

Further, in this embodiment, the touch screen terminal further includes a first filter module 401, wherein the screen antenna 12 is connected to the near field communication manager 22 via the first filter module 401. The first filter module 401 is configured to perform anti-electromagnetic interference (EMI) filter and impedance matching for a near field communication signal received and sent by the screen antenna 12, and includes a first resistor R1, a first capacitor C1 and a second capacitor C2, wherein one line terminal of the screen antenna 12 is electrically connected to the first reception buffering module 2221 and the first sending module 2231 via the first resistor R1 and the other line terminal of the screen antenna 12 is connected to the reference voltage output terminal of the reference voltage module 2221, the first capacitor C1 is connected between the two line terminals of the screen antenna 12, and the second capacitor C2 is connected between the other line terminal of the screen antenna 12 and the ground.

Figure 4B:
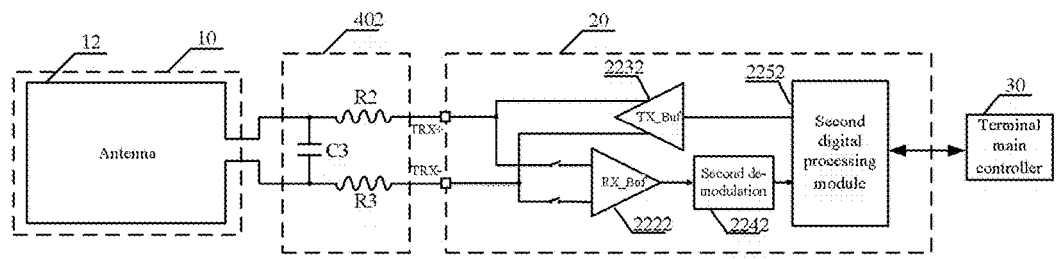
FIG. 4B is a schematic diagram of a structure of a near field communication manager and connection of the near field communication manager and a peripheral component according to the second embodiment of the present disclosure.

FIG. 4B illustrates a structure of the near field communication manager 22 and connection of the near field communication manager 22 and a peripheral component according to the second embodiment of the present disclosure. In this embodiment, the near field communication manager 22 includes a second reception buffering module 2222, a second sending module 2232, a second demodulation module 2242 and a second digital processing module 2252. The second reception buffering module 2222 is configured to buffer and amplify an external near field communication signal received by the screen antenna 12. The signal is differentially input, and the two input terminals of the second reception buffering module 2222 are respectively electrically connected to the two line terminals of the screen antenna 12 via a switch unit. Two output terminals of the second sending module 2232 are respectively electrically connected to the two line terminals, and the second sending module 2232 is configured to send out, via the screen antenna 12, a near field communication signal to be output. During working, the signals output by the two output terminals have opposite levels. To be specific, the second sending module 2232 is an output buffer having a specific driving capability which is capable of outputting 13.56 MHz square waveforms. When the second sending module 2232 is idle, the second sending module may enter a high impedance state, to prevent the input signal from being bypassed, and ensure that the second reception buffering module 2222 is capable of working in a normal bias state. The second sending module 2232 differentially outputs signals. To be specific, when a signal is output, if one terminal of the second sending module 2232 is a high level, the other terminal is a low level; when the second sending module 2232 is idle, the two terminals thereof both output high impedance. When the second sending module 2232 is idle, the switch unit before the second reception receiving module 2222 is switched off, to prevent the second sending module 2232 from interfering the working bias state of the second reception buffering module 2222; and when the second sending module 2232 is idle, the switch unit before the second reception buffering module 2222 is switched on, to facilitate reception and processing of the screen antenna signal.

An input terminal of the second demodulation module 2242 is connected to the second reception buffering module 2222, and is configured to demodulate the signal amplified by the second reception buffering module 2222 into a digital signal, to complete the task of demodulation from a radio frequency field to a digital signal. A second digital processing module 2252 with one terminal being connected to an output terminal of the second demodulation module 2242 and an input terminal of the second sending module 2232 and with the other terminal being connected to the terminal main controller 30 is configured to decode the digital signal obtained via demodulation by the second demodulation module 2242, and send a decoding result to the terminal main controller 30; and is further configured to receive data to be sent from the terminal main controller 30 and demodulate the received data, and output a signal upon modulation to the second sending module 2232.

Further, in this embodiment, the touch screen terminal further includes a second filter module 402, wherein the screen antenna 12 is connected to the near field communication manager 22 via the second filter module 402. The second filter module 402 is configured to perform EMI filter and impedance matching for a near field communication signal received and sent by the screen antenna 12, and comprises a second resistor R2, a third resistor R3 and a third capacitor C3, wherein one line terminal of the screen antenna 12 is electrically connected to the second reception buffering module 2222 and the second sending module 2232 via the second resistor R2 and the other line terminal of the screen antenna 12 is connected to the second reception buffering module 2222 and the second sending module 2232 via the third resistor R3, and the third capacitor C3 is connected between the two line terminals of the screen antenna 12.

Figure 5A:
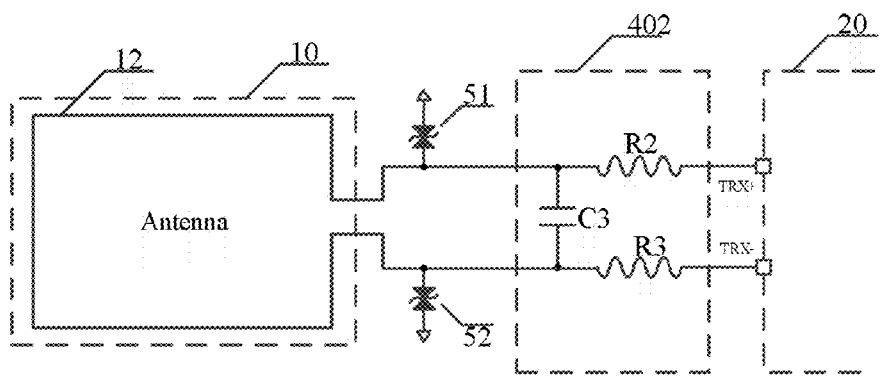
FIG. 5A and FIG. 5B are schematic structural diagrams of an added ESD protection function in FIG. 4B.
Figure 5B:
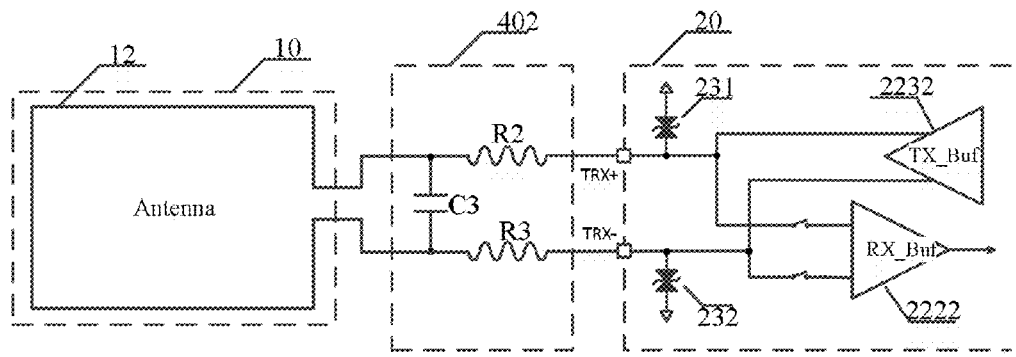

Further, as illustrated in FIG. 4B, an ESD protection function may be configured in the near field communication manager 22. As illustrated in FIG. 5A and FIG. 5B, the two manners are detailed as follows: in FIG. 5A, two ESD protective diodes 51 and 52 are respectively connected to the two line terminals at the interface of the screen antenna and then connected to the ground line, thereby forming ESD protection and ensuring that the touch control chip circuit is more secure. Based on the touch control chip circuit, two devices are added, which thus increases the cost and occupies the circuit area. The advantage of this circuit lies in a better protection effect over that in FIG. 5B. As illustrated in FIG. 5B, two ESD protective circuits 231 and 232 are directly integrated in the touch control chip, to form ESD protection and ensure that the internal circuit of the chip is more secure. To be specific, the ESD protective circuit 231 is connected between an output terminal of the second sending module 2232 and the ground, and the ESD protective circuit 232 is connected between the other output terminal of the second sending module 2232 and the ground. The ESD protective circuit achieves a very limited ESD protection effect and the cost of the chip is slightly increased. The advantage thereof lies in that the peripheral circuit is simple and the circuit area becomes smaller.

As illustrated in FIG. 4A, similarly a manner of configuring the ESD protection function is configured in the interior or the exterior of the touch control chip 20 is used. That is, configuring the ESD protection function in the exterior of the chip is respectively connecting the two line terminals of the screen antenna to the ground via an ESD protective diode; and configuring the ESD protection function in the interior of the chip is connecting the reference voltage output terminal of the reference voltage module 2211 to the ground via an ESD protective diode, and connecting the output terminal of the first sending module 2231 to the ground via an ESD protection diode.

Referring to the structures of the near field communication manager 22 as illustrated in FIG. 4A and FIG. 4B, since the conventional near field communication antenna is ideal, a signal does not need to be amplified. In addition, the signal is returned to the card reader by means of regulating the power consumption load of the near field communication manager. However, the single-turn antenna according to the present disclosure has a great impedance and weak signal, and thus amplification is needed. If the signal needs to be returned by means of regulating the load, after the display screen absorbs the energy, the returned signal is also very weak. Therefore, the two problems that the wiring impedance of the single-turn silver slurry is great and that the attenuation caused by the terminal display screen and the like elements to the communication signal is great are solved by means of amplifying a signal and actively sending a driving signal by the reception buffering module in the circuitry.

Figure 6:
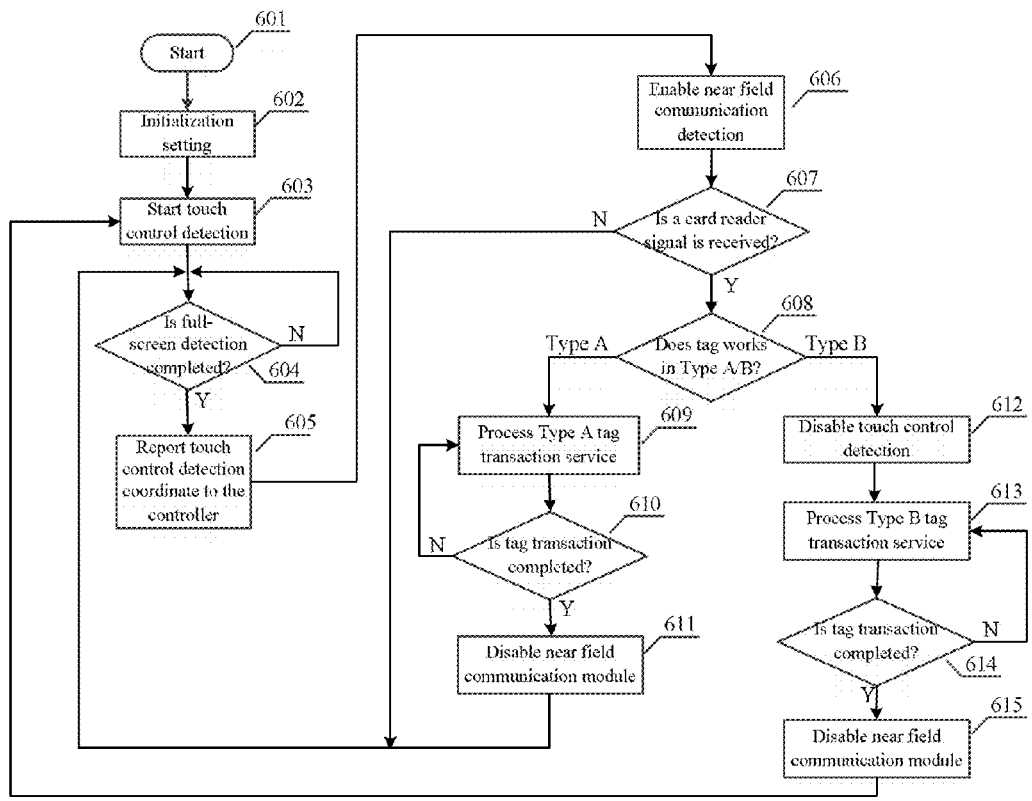
FIG. 6 is a working flowchart of a touch screen terminal having an NFC function according to an embodiment of the present disclosure.

FIG. 6 illustrates a working process of a touch screen terminal having the NFC function according to an embodiment of the present disclosure. The process mainly includes a touch control detection step and a near field communication detection step. In the touch control detection step, the touch control manager 21 detects whether a touch control operation is performed on the touch screen 10, and sends the calculated touch coordinate to the terminal main controller 30. In the near field communication detection step, the touch control manager 22 performs a full-screen detection and then starts performing the near field communication detection.

Step 601: The main program of the touch control chip is started.

Step 602: Settings of the related register are initialized, for example, timer, I/O state and the like of the terminal main controller 30.

Step 603: Touch control detection is enabled, and the related register and the related interrupt program are properly set, then the touch control detection process may be automatically run.

Step 604: It is judged whether a full-screen scanning of touch control is completed; and if the full-screen scanning is not completed, a period of time later, it is continuously judged whether the full-screen scanning is completed.

Step 605: If a full-screen touch control scanning is completed, coordinate information detected by the touch control is calculated based on the scanned data, and the coordinate calculated is reported to the terminal main controller 30.

Step 606: After step 605, the near field communication detection module is enabled to receive a 13.56 MHz magnetic field signal from a card reader.

Step 607: It is judged whether the 13.56 MHz magnetic field signal is received from the card reader; and if no such signal is received, the process directly returns to step 604, and a next run of touch control coordinate judgment is made.

Step 608: If the 13.56 MHz magnetic field signal is received from the card reader, it is further judged whether a state set for the current RFID tag is a Type A (first state) or Type B (second state). The RFID tag includes a near field communication manager and a screen antenna. In the embodiment of the present disclosure, the difference between Type A state and Type B state lies in that: the modulation signals corresponding to Type A have a 100% depth and are very strong, and reception and modulation of Type A signals are not easily subjected to the interference caused by the touch screen scanning signal, and thus the touch control detection does not need to be disabled; whereas the modulation signal corresponding to Type B signals has only a 10% depth, and reception and modulation of Type B signals are not easily subjected to the interference caused by the touch screen scanning signal, and thus the touch control detection needs to be disabled to eliminate the interference.

Step 609: If the currently set state is Type A, the process enters Type A tag transaction service, for example, completion of a Type A process of ISO14443-3 and the like.

Step 610: It is judged whether the current transaction is completed; and if not completed, the process goes to step 609 (in the case where the magnetic field of the card reader is not disabled and the command is not suspended).

Step 611: If the current transaction is completed (in the case where the magnetic field of the card reader is disabled), the near field communication is disabled to save energy; and the process directly returns to step 604 to perform a next run of touch coordinate judgment.

Step 612: If the currently set state is Type B, to prevent the mutual interference between a touch control signal and a near field communication signal, the touch control signal is firstly disabled.

Step 613: The process enters the Type B tag transaction service, for example, completion of a Type B process of ISO14443-3 and the like.

Step 614: It is judged whether the current transaction is completed; and if not completed, the process goes to step 613 (in the case where the magnetic field of the card reader is not disabled and the command is not suspended).

Step 615: If the current transaction is completed (in the case where the magnetic field of the card reader is disabled), the near field communication is disabled to save energy; and the process directly returns to step 603 and the touch control detection is enabled, to perform a next run of touch coordinate judgment.

After two functions are enabled, if not disabled, the two functions run parallelly and data is generated in a space of a register. The terminal main controller 30 is responsible for performing operational processing for the data.

In conclusion, according to the present disclosure, the ESD conductive wire of the touch screen is reused as the antenna for near field communication, and compatibility of the touch detection with the near field communication function is achieved with almost zero cost. Since there is only one turn of screen antenna, the screen antenna may be simply practiced and suitable for the design of narrow frame screen. Since the screen antenna is deployed on the substrate of the touch screen, and does not need to be disassembled, problems such as abrasion may be prevented and thus smooth near field communication may be ensured. In addition, the two problems that the wiring impedance of the single-turn silver slurry is great and that the attenuation caused by the terminal display screen and the like elements to the communication signal is great are solved by means of amplifying a signal and actively sending a driving signal by the reception buffering module. The present disclosure is mainly applicable to data exchange, financial transaction, access control management and the like scenarios.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A touch screen terminal, comprising:
an NFC antenna-integrated touch screen, comprising:
a substrate having a touch sensing region;
a touch sensing electrode arranged in the touch sensing region; and
a single-turn conductive wire which is used as a ground loop of electrostatic discharge (ESD) conductive wire, arranged on a periphery of the touch sensing region, wherein the single-turn conductive wire is not contacted with the touch sensing region and is reused as a screen antenna for near field communication; and
a touch control chip, comprising:
a touch control manager connected to the touch sensing electrode, wherein the touch control manager is configured to process a sensing signal from the touch sensing electrode and calculate a touch coordinate; and
a near field communication manager connected to the single-turn conductive wire, wherein the near field communication manager is configured to process a near field communication; and
a terminal main controller, configured to acquire and manage information of the touch control and near field communication;
wherein the near field communication manager is configured to:

have a reference voltage output terminal, wherein the reference voltage output terminal is electrically connected to a first end of the screen antenna, and wherein the reference voltage output terminal is configured to provide a reference voltage and a bias for the touch control chip;
have an input terminal, wherein the input terminal is electrically connected to a second end of the screen antenna via a switch unit;
buffer and amplify an external near field communication signal received by the screen antenna;
have an output terminal, wherein the a second output terminal is electrically connected to the a second end of the screen antenna;
send out, via the screen antenna, a near field communication signal to be output, wherein sending out a near field communication signal to be output occurs at a different time as buffering and amplifying an external field communication signal received by the screen antenna, and when an external near field communication signal received by the screen antenna is buffered and amplified, the switch unit is switched on, and when a near field communication signal to be output is sent out, the switch unit is switched off;
demodulate the amplified signal into a digital signal; and
be connected to the terminal main controller, wherein the near field communication manager is configured to decode the digital signal obtained via demodulation, and send a decoded result to the terminal main controller; and
receive data to be sent from the terminal main controller and demodulate the received data, and output a modulated signal to be sent out to the antenna.

2. The touchscreen terminal according to claim 1, where in the first sending module is idle, the output terminal thereof stays in a high-impedance state.

3. The touch screen terminal according to claim 1, wherein the touch screen terminal further comprises a first filter module, and the screen antenna is connected to the near field communication manager via the first filter module;
wherein the first filter module is configured to perform anti-electromagnetic interference (EMI) filter and/or impedance matching for a near field communication signal received and sent by the screen antenna, and comprises a first resistor, a first capacitor and a second capacitor, wherein one terminal of the screen antenna is electrically connected to the near field communication manager via the first resistor and the other terminal of the screen antenna is connected to the reference voltage output terminal, the first capacitor is connected between the two line terminals of the screen antenna, and the second capacitor is connected between the other line terminal of the screen antenna and the ground.

4. The touch screen terminal according to claim 1, wherein two line terminals of the screen antenna are respectively connected to the ground via an ESD protective diode.

5. The touch screen terminal according to claim 3, wherein the reference voltage output terminal is connected to the ground via an ESD protective diode, and the output terminal is connected to the ground via an ESD protective diode.

* * * * *